United States Patent
Osajima

(10) Patent No.: US 11,172,090 B2
(45) Date of Patent: Nov. 9, 2021

(54) IMAGE FORMING APPARATUS AND NON-TRANSITORY COMPUTER READABLE MEDIUM FOR RESTRICTING EXECUTION OF FUNCTION BASED ON VALIDATED RESTRICTION INFORMATION

(71) Applicant: FUJIFILM BUSINESS INNOVATION CORP., Tokyo (JP)

(72) Inventor: Kentaro Osajima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 11 days.

(21) Appl. No.: 16/747,848

(22) Filed: Jan. 21, 2020

(65) Prior Publication Data
US 2021/0084183 A1    Mar. 18, 2021

(30) Foreign Application Priority Data

Sep. 18, 2019   (JP) .............................. JP2019-169109

(51) Int. Cl.
*H04N 1/00*   (2006.01)
*H04N 1/21*   (2006.01)

(52) U.S. Cl.
CPC ....... *H04N 1/00875* (2013.01); *H04N 1/2175* (2013.01)

(58) Field of Classification Search
CPC .... G06F 3/1236; G06F 3/1238; G06F 3/1239; G06K 15/4005; H04N 1/00875; H04N 1/2175; H04N 2201/0094

USPC ................................................ 358/1.14, 1.15
See application file for complete search history.

(56) References Cited

U.S. PATENT DOCUMENTS

| | | | |
|---|---|---|---|
| 2005/0254098 A1* | 11/2005 | Matsuda | H04N 1/32587 358/402 |
| 2006/0132823 A1* | 6/2006 | Sakamoto | G06F 3/1222 358/1.14 |
| 2006/0176507 A1* | 8/2006 | Kobayashi | H04N 1/00347 358/1.15 |
| 2009/0284791 A1* | 11/2009 | Osada | G06F 3/1261 358/1.15 |
| 2011/0055764 A1 | 3/2011 | Akuzawa | |

FOREIGN PATENT DOCUMENTS

| | | |
|---|---|---|
| JP | 2011-049738 A | 3/2011 |
| JP | 2017-204221 A | 11/2017 |

* cited by examiner

*Primary Examiner* — Kent Yip
(74) *Attorney, Agent, or Firm* — Oliff PLC

(57) ABSTRACT

An image forming apparatus includes: a reception unit that receives, from another apparatus, data for replication of a function of storing data in a preset storage area; a validation unit that validates restriction information for controlling execution of the function if the data for replication received by the reception unit includes information indicating that plural networks are set in the storage area in which the data is to be stored by the function; and a restriction unit that restricts execution of the function if the execution of the function is instructed and the restriction information is validated.

11 Claims, 10 Drawing Sheets

EXAMPLE OF DISPLAY OF WARNING SCREEN
(IMAGE FORMING APPARATUS 40)

EXECUTION OF ONE-TOUCH APPLICATION WILL ALLOW FUNCTION OF CONFIDENTIAL BOX OF DOCUMENT SAVING DESTINATION TO AUTOMATICALLY GENERATE NETWORK COMMUNICATION.
CHECK WHETHER OR NOT NETWORK TYPE SET FOR CONFIDENTIAL BOX IS APPROPRIATE.

CLOSE

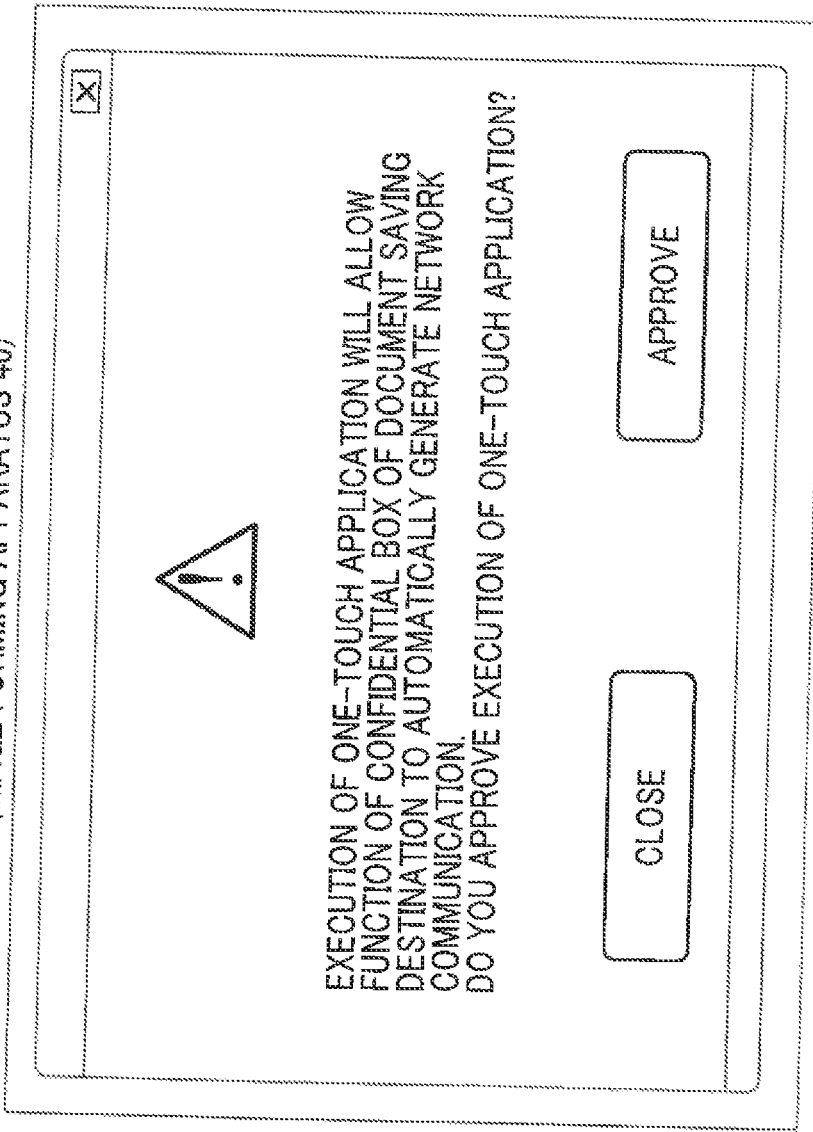

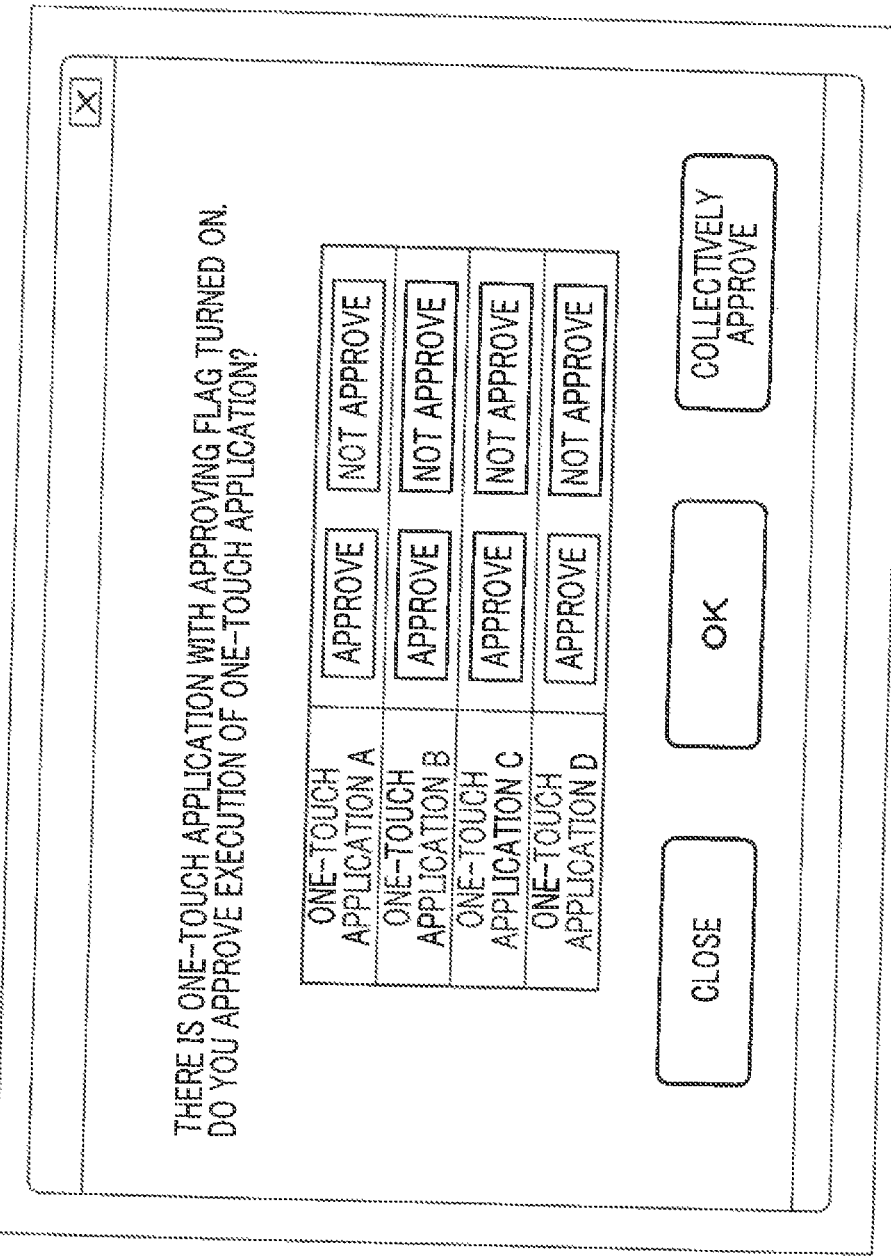

IMAGE FORMING APPARATUS AND NON-TRANSITORY COMPUTER READABLE MEDIUM FOR RESTRICTING EXECUTION OF FUNCTION BASED ON VALIDATED RESTRICTION INFORMATION

CROSS-REFERENCE TO RELATED APPLICATIONS

This application is based on and claims priority under 35 USC 119 from Japanese Patent Application No. 2019-169109 filed Sep. 18, 2019.

BACKGROUND (i) Technical Field

The present disclosure relates to an image forming apparatus and a non-transitory computer readable medium.

(ii) Related Art

JP-A-2011-049738 discloses an image processing apparatus including: a memory that stores setting information for executing a function in the image processing apparatus; an execution unit that executes a function according to the setting information stored in the memory; a determination unit that determines whether or not a user operation is required for the execution unit to execute the function according to the setting information stored in the memory; an adding unit that adds attribute information indicating whether or not to permit automatic execution of the function according to the setting information based on an instruction from an information processing apparatus according to the result of the determination by the determination unit, to the setting information; and a transmission unit that transmits the setting information to which the adding unit adds the attribute information, to the information processing apparatus.

JP-A-2017-204221 discloses an application management apparatus including: a memory for storage by associating an application and an application administrator who is an administrator of the application with each other; a reception unit that receives an operation for managing the application; a comparison unit that compares the application administrator associated with the application and an operator who performs an operation for managing the application in a case of receiving the operation for managing the application by the reception unit; and a permission unit that permits the operation for managing the application based on the comparison result by the comparison unit.

In a case of replicating a function of storing data in a confidential box, such as a storage area that can be connected to a network, from another apparatus, when the confidential box with the same identifier that exists in an apparatus at a replication destination is used as it is on the image forming apparatus, when the confidential box of the apparatus of the replication destination is connected to another network, the data is transmitted to a network not intended by the user.

SUMMARY

Aspects of non-limiting embodiments of the present disclosure relate to providing an image forming apparatus and a non-transitory computer readable medium, which allow execution of a function of storing data in a storage area that is replicated from another apparatus and connectable to a network while preventing execution of the function based on network information not intended by a user, in contrast to the case where the execution of the function is not restricted.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including: a reception unit that receives, from another apparatus, data for replication of a function of storing data in a preset storage area; a validation unit that validates restriction information for controlling execution of the function if the data for replication received by the reception unit includes information indicating that plural networks are set in the storage area in which the data is to be stored by the function; and a restriction unit that restricts execution of the function if the execution of the function is instructed and the restriction information is validated.

BRIEF DESCRIPTION OF THE DRAWINGS

Exemplary embodiments of the invention will be described in detail based on the following figures, wherein:

FIG. 9 is a view illustrating an example of the display screen displayed on the operation panel when the one-touch application is activated in the image forming apparatus 40 that is the cloning destination; and FIG. 10 is a view illustrating an example of an administrator screen when the one-touch application is cloned in the image forming apparatus 40 that is the cloning destination.

DETAILED DESCRIPTION

Hereinafter, an exemplary embodiment of the present disclosure will be described with reference to the attached drawings.

Figure 1:
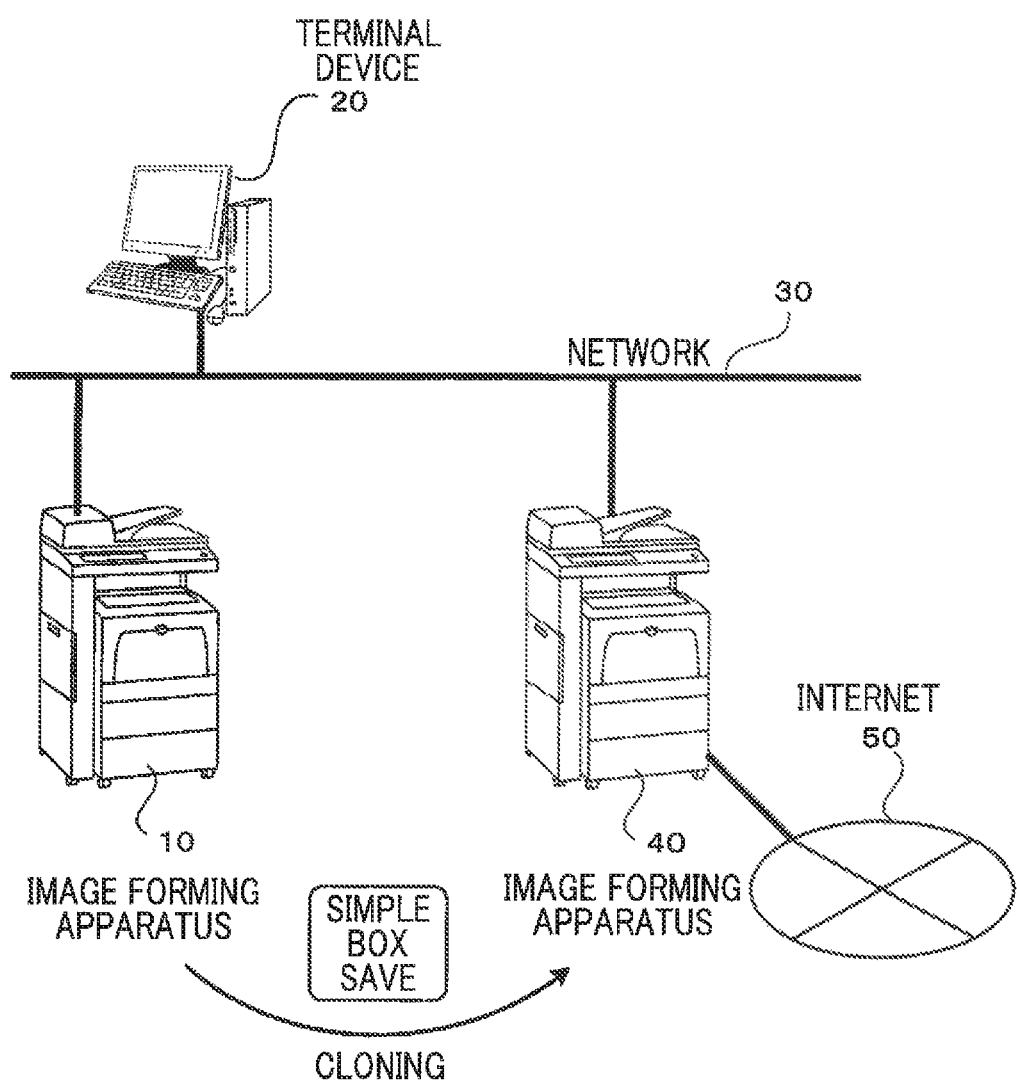
FIG. 1 is a view illustrating a configuration of an image forming system according to an exemplary embodiment of the present disclosure.

FIG. 1 is a view illustrating a configuration of an image forming system according to an exemplary embodiment of the present disclosure.

As illustrated in FIG. 1, the image forming system according to the exemplary embodiment of the present disclosure includes image forming apparatuses 10 and 40 and a terminal device 20 connected to each other via a network 30. The terminal device 20 generates print data and transmits the generated print data to the image forming apparatus 10 via the network 30. The image forming apparatus 10 receives the print data transmitted from the terminal device 20 and outputs an image that corresponds to the print data on a paper sheet. The image forming apparatus 10 is an apparatus called a so-called multifunction machine having plural functions, such as a printing function, a scanning function, a copying function, and a facsimile function.

In the exemplary embodiment, a case where an application program (hereinafter, abbreviated as an application) generated on the image forming apparatus 10 is cloned into the image forming apparatus 40 will be described.

Here, "cloning" means replicating data or an application generated in a certain apparatus, setting information in a certain apparatus, or the like to another apparatus. Specifically, the cloning is used when the setting information or various pieces of data on one image forming apparatus are also replicated to another image forming apparatus by performing setting of usage environment of a user, input of user data, and the like, in the one image forming apparatus when plural image forming apparatuses are installed. In addition, in a case of saving the setting information and various pieces of data on the image forming apparatus as cloning data before replacement when replacing the image forming apparatus and replicating the saved cloning data to the image forming apparatus after the replacement, or in a case of restoring the cloning data saved as backup when the data is destroyed, the cloning is used.

By performing such cloning, it is possible to save the effort of recreating a one-touch application or the like created in a certain image forming apparatus in a new image forming apparatus. Here, the one-touch application is a function of executing specific processing based on contents set by the user.

In the exemplary embodiment, as an example, a case where an application called "simple box save" that can save scanned data in a confidential box with a simple operation is cloned from the image forming apparatus 10 to the image forming apparatus 40 will be described. The "simple box save" application is a one-touch application created by the user, and by activating the application which is called "simple box save" after setting an original document in a scanner, only by one touch or one operation, processing of storing the image data read by performing scanning under conditions, such as preset color mode or resolution, in a designated confidential box is performed.

In addition, the one-touch application includes a private application that can be used by only one user and a public application that can be used by plural registered users.

Here, the confidential box means a storage area for saving various data. Each confidential box has its own owner, and only the owner can read or retrieve the saved various pieces of data, or only plural users can read or retrieve various pieces of data.

The confidential box is managed by a box number that is an identifier, and by setting a box number for each application, it is possible to store processed data in a designated confidential box. Furthermore, in the confidential box, a network to be used can be set, and a function of executing processing set in advance for the stored document data, for example, processing for transferring, FAX transmission, or e-mail transmission to a specific destination, can be set.

In addition, the image forming apparatus 40 in the exemplary embodiment is connected to the network 30 and the Internet 50. In other words, the image forming apparatus 40 includes a multi-interface that is connectable to the plural networks. The image forming apparatus 40 can set a network to be used for each confidential box, and each confidential box of the image forming apparatus 40 can be set in association with a job order including information on the network to be used as an attribute.

Figure 2:
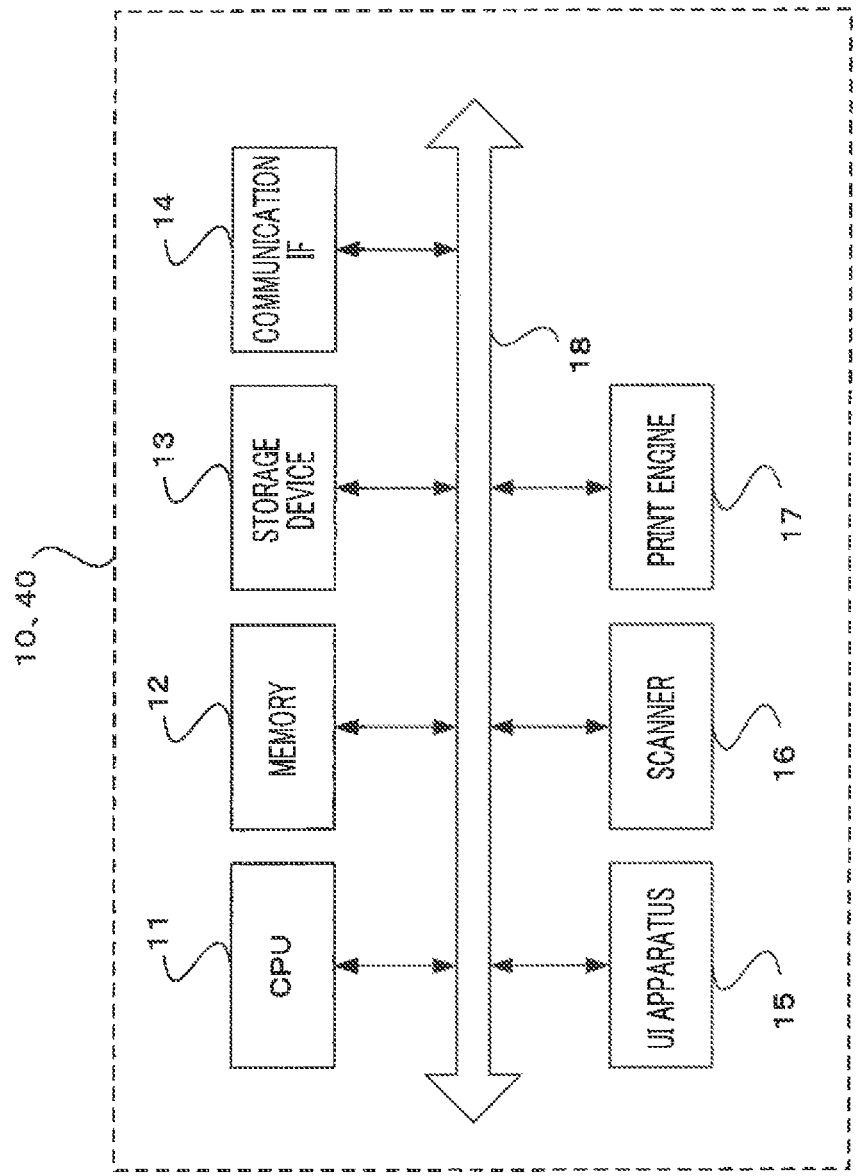
FIG. 2 is a block diagram illustrating a hardware configuration of image forming apparatuses 10 and 40 according to the exemplary embodiment of the present disclosure.

Next, FIG. 2 illustrates a hardware configuration of the image forming apparatuses 10 and 40 in the image forming system of the exemplary embodiment. In the exemplary embodiment, the image forming apparatuses 10 and 40 are respectively described as an image forming apparatus that is a replication source and an image forming apparatus that is a replication destination, but both have the same configuration.

As illustrated in FIG. 2, the image forming apparatuses 10 and 40 include a CPU 11, a memory 12, a storage device 13, such as a hard disk drive, a communication interface (abbreviated as IF) 14 that transmits and receives data to and from an external apparatus via a network, a user interface (abbreviated as UI) apparatus 15 including a touch panel, a liquid crystal display, a keyboard, a scanner 16, and a print engine 17. These configuration elements are connected to each other via a control bus 18.

The print engine 17 prints an image on a recording medium, such as printing paper sheet, through processes, such as charging, exposure, development, transfer, and fixing.

The CPU 11 executes predetermined processing based on a control program stored in the memory 12 or the storage device 13 and controls the operation of the image forming apparatus 10. In the exemplary embodiment, the CPU 11 is described as a component that reads and executes the control program stored in the memory 12 or the storage device 13, but the program can also be stored in a storage medium, such as a CD-ROM, and provided in the CPU 11.

Figure 3:
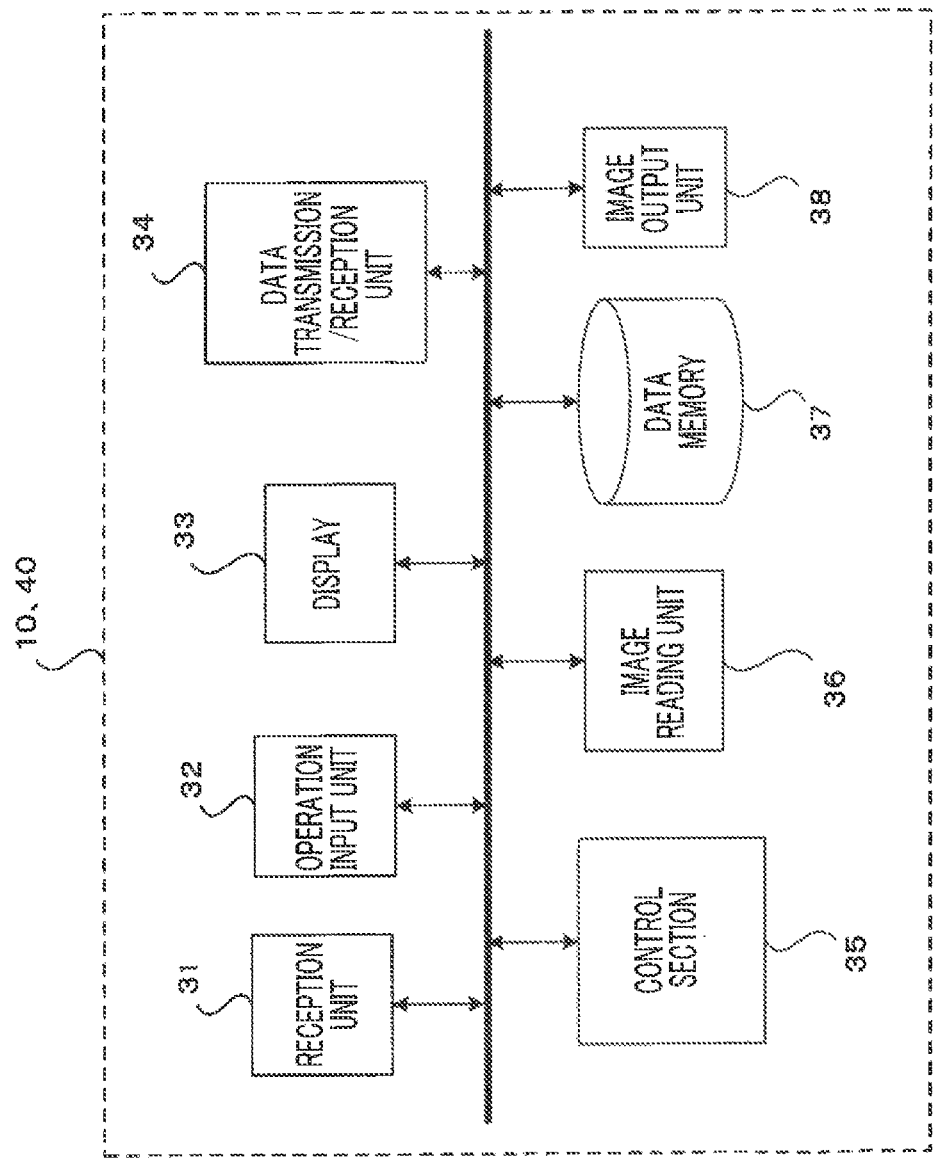
FIG. 3 is a block diagram illustrating a functional configuration of the image forming apparatuses 10 and 40 according to the exemplary embodiment of the present disclosure.

FIG. 3 is a block diagram illustrating a functional configuration of the image forming apparatuses 10 and 40 realized by executing the control program.

As illustrated in FIG. 3, the image forming apparatuses 10 and 40 according to the exemplary embodiment include a reception unit 31, an operation input unit 32, a display 33, a data transmission/reception unit 34, a control section 35, an image reading unit 36, a data memory 37, and an image output unit 38.

The reception unit 31 receives identification information for identifying a user who uses the image forming apparatuses 10 and 40. In other words, the reception unit 31 receives information on whether the user is the owner who generated the one-touch application or an administrator of the image forming apparatus, or whether or not the user is a person other than the owner or the administrator.

The operation input unit 32 receives input of various operations from the user. The display 33 displays various pieces of information to the user.

The image reading unit 36 reads an image from the set original document. The image output unit 38 outputs an image on a recording medium, such as a printing paper sheet. The data memory 37 stores various pieces of data, such as print data generated by the control section 35. In addition, the data stored in the confidential box is actually stored in the data memory 37.

The control section 35 controls the image reading unit 36, the image output unit 38, the display 33, and the like based on the operation received by the reception unit 31 or the operation input unit 32, and controls various operations, such as a printing operation and a scanning operation.

The data transmission/reception unit 34 transmits and receives data to and from another apparatus via the network. When the cloning is performed, the data transmission/reception unit 34 performs processing for outputting the generated cloning data to the outside or receiving the cloning data generated in the external apparatus. In other words, the data transmission/reception unit 34 functions as a reception unit that receives cloning data for executing a function of storing the data in a preset confidential box from another apparatus.

Here, the cloning data is data used when cloning the functions, such as data or various applications. In the exemplary embodiment, a case where the data for executing the one-touch application called "simple box save" which is an example of a function of storing specific data in a preset confidential box, is output from the image forming apparatus 10 as cloning data, and is input into the image forming apparatus 40, that is, a case where a function of transferring the stored data to a specific destination is set in each confidential box in the image forming apparatuses 10 and 40, will be described as an example.

When the control section 35 clones the "simple box save" one-touch application to another apparatus, the cloning data including information on whether or not a network is set in the confidential box in which the one-touch application stores the data, is generated. At this time, the control section 35 functions as a generation unit that generates the cloning data. In addition, the control section 35 functions as an output unit that outputs the generated cloning data.

In addition, when the cloning data received by the data transmission/reception unit 34 includes information indicating that plural networks are set in the confidential box that is the storage destination of the "simple box save" application, the control section 35 turns on and validates an unapproved flag which is restriction information for restricting the execution of the "simple box save" application. At this time, the control section 35 functions as a validation unit that validates the unapproved flag.

Further, the control section 35 restricts the execution of the "simple box save" application if the execution of the "simple box save" application is instructed and the unapproved flag is validated. In other words, the control section 35 performs control such that the "simple box save" application cannot be executed. At this time, the control section 35 functions as a restriction unit that restricts the execution of the "simple box save" application.

Further, the control section 35 performs control such that a warning screen indicating that the execution of the "simple box save" application is to be restricted is displayed on the display 33 when the unapproved flag is validated and the execution of the "simple box save" application is restricted. On the warning screen, information indicating that the execution of the "simple box save" application is to be restricted and information indicating the network are displayed. The control section 35 functions as a display controller that controls the display 33.

In addition, when the identification information received by the reception unit 31 belongs to the owner of the "simple box save" application or the administrator of the image forming apparatus, the control section 35 performs control such that an approval button which is a handler that receives an approval of execution of the "simple box save" application is displayed on the warning screen of the display 33. When the approval button is pressed on the warning screen, the control section 35 turns off and invalidates the unapproved flag. In other words, the "simple box save" application can be executed.

In addition, when the identification information received by the reception unit 31 belongs to a person other than the owner of the "simple box save" application or the administrator of the image forming apparatus, the control section 35 stops the execution of the application and ends the processing after the warning screen indicating that the execution of the "simple box save" application is to be restricted is displayed.

In addition, after the plural one-touch applications are cloned to the image forming apparatus and before any of the one-touch applications is executed in the image forming apparatus, when the identification information received by the reception unit 31 belongs to the administrator of the image forming apparatus, the control section 35 performs control such that a collective approval screen for collectively approving the execution of the plural one-touch applications is displayed on the display 33.

Then, when the execution of the plural one-touch applications is collectively approved on the collective approval screen, the control section 35 turns off and invalidates the unapproved flag of the one-touch applications which are collectively approved.

Then, when the one-touch application of which the unapproved flag is invalidated is executed, the control section 35 executes the one-touch application without displaying the warning screen indicating that the execution of the "simple box save" is to be restricted or the approval screen for approving the execution of the "simple box save" on the display 33.

After the cloning is performed in this manner, the unapproved flag that restricts the execution of the one-touch application is turned on and validated, because, when registration of the confidential box with a network set in the image forming apparatus that is the cloning destination is performed, there is a possibility that another network is set in the confidential box having the same number as the confidential box used by the one-touch application to be cloned.

A problem does not occur when registering the confidential box of the application to be cloned by checking the network setting of the confidential box in the apparatus that is the cloning destination when the cloning is performed. However, when there are multiple applications to be cloned, the effort to perform such operations becomes enormous.

When the network setting of the confidential box of apparatus that is the cloning destination is ignored and the confidential box with the same box number is registered in the cloning destination, there is a possibility that the data is transmitted to the network set in the confidential box of the apparatus that is the cloning destination.

Furthermore, in the confidential box, since there is a function that can make it possible to execute processing set in advance for the stored document data, for example, processing for transferring, FAX transmission, or e-mail transmission to a specific destination, there is also a possibility that the data is transmitted to a destination that is not intended when the data is saved in a pre-registered confidential box.

Therefore, in the exemplary embodiment, in accordance with such various situations, the one-touch application that uses a confidential box with a network set is cloned from one apparatus to another apparatus, and in a state where the plural networks can be set in the confidential box in the apparatus that is the cloning destination, and when the unapproved flag is valid, the warning screen is displayed when using the one-touch application.

Next, the operation of the image forming apparatus according to the exemplary embodiment will be described in detail with reference to the drawings.

Figure 4:
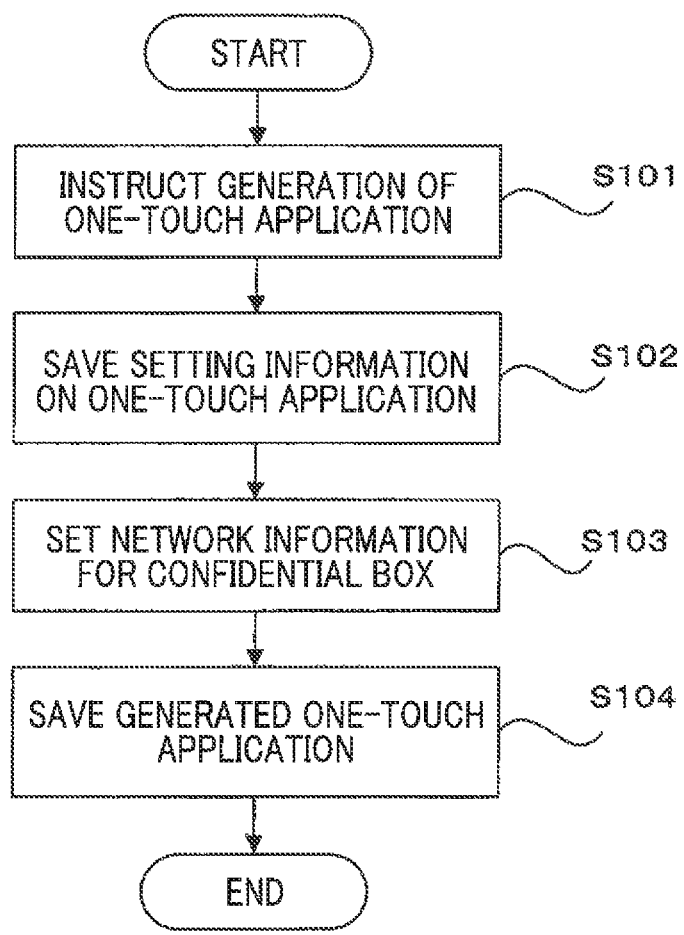
FIG. 4 is a flowchart for describing processing when cloning data is generated in the image forming apparatus 10 that is a cloning source.

First, processing when generating the "simple box save" one-touch application for saving the scanned data in the preset confidential box in the image forming apparatus 10 that is the cloning source, will be described with reference to the flowchart of FIG. 4.

First, in step S101, a user who is a user of the apparatus operates the operation panel of the image forming apparatus 10 to instruct generation of the data for generating the "simple box save" one-touch application.

In step S102, a storage destination for storing the data scanned by the "simple box save" one-touch application is set to, for example, a confidential box number 001, and they are saved as setting information.

Figure 5:
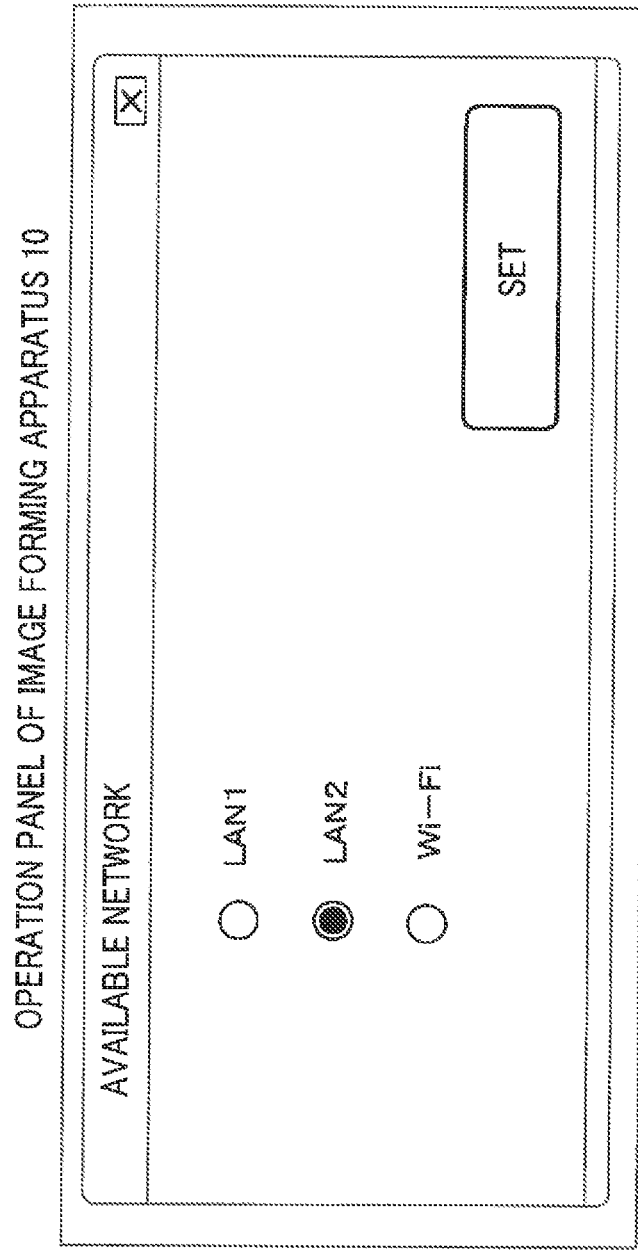
FIG. 5 is a view illustrating an example of a display screen displayed on an operation panel when the cloning data is generated in the image forming apparatus 10 that is the cloning source.

In step S103, the network information to be used is set in the confidential box number 001 that is the storage destination of the "simple box save" one-touch application. The network information set in the confidential box is generated as the cloning data together with the "simple box save" application data as an attribute. Specifically, on the operation panel of the image forming apparatus 10, as illustrated in FIG. 5, for example, "LAN1", "LAN2", and "Wi-Fi (registered trademark)" are displayed as a network that can be used for the confidential box number 001. Then, the network to be used is selected from these three, the "set" button is pressed, and accordingly, the network to be used is set in the confidential box number 001 that is the storage destination.

In step S104, the "simple box save" one-touch application generated in this manner is saved in the data memory 37 of the image forming apparatus 10 as the cloning data.

Then, the administrator moves the cloning data saved in the data memory 37 of the image forming apparatus 10 to the image forming apparatus 40 via a USB memory or the network 30, and instructs the import of the cloning data to the image forming apparatus 40. Specifically, the import of the "simple box save" one-touch application as the cloning data is instructed. At this time, the unapproved flag indicating that the cloning data is unapproved is validated.

Figure 6:
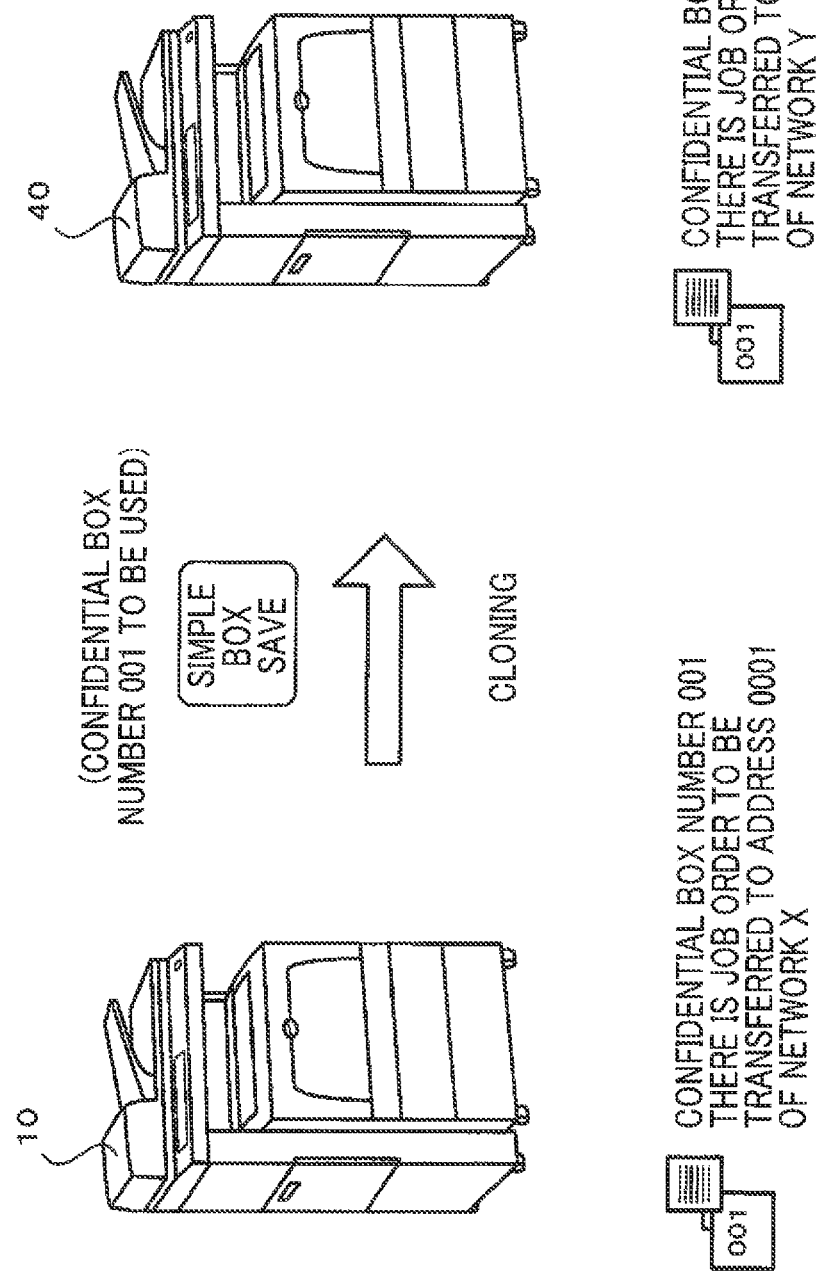
FIG. 6 is a view for describing a setting state of a confidential box in each of the image forming apparatuses 10 and 40.

In the following description, a case where the confidential box is registered as illustrated in FIG. 6 in each of the image forming apparatuses 10 and 40 will be described.

The image forming apparatus 10 that is the cloning source saves the "simple box save" application that saves a scanned document in the confidential box number 001. In the confidential box number 001 of the image forming apparatus 10, a network X is set as a network to be used, and a job order indicating transfer to an address 0001 of the network X is saved as an attribute.

In the confidential box number 001 of the image forming apparatus 40 that is the cloning destination, a network Y is set as a network to be used, and a job order indicating transfer to the address 0001 of the network Y is saved as an attribute.

Figure 7:
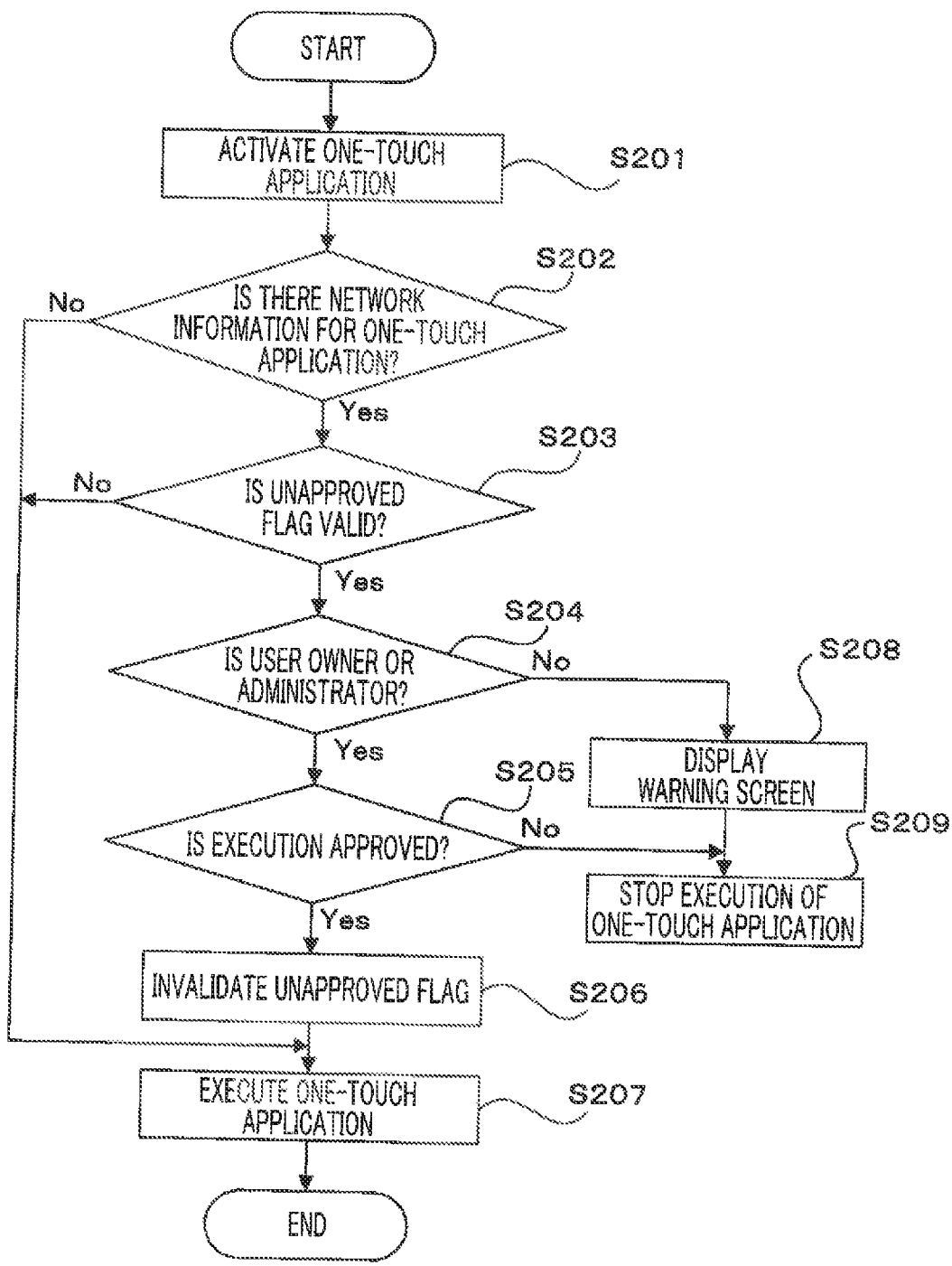
FIG. 7 is a flowchart for describing processing when a one-touch application is executed in the image forming apparatus 40 that is the cloning destination.

In this state, the operation when the "simple box save" one-touch application is activated in the image forming apparatus 40 will be described with reference to the flowchart of FIG. 7.

First, in step S201, the user activates the "simple box save" application. Then, in step S202, it is determined whether or not network information is set in the "simple box save" application that is the cloning data. When the network information is not set in the "simple box save" application, the "simple box save" application is executed in step S207.

When the network information is set in the "simple box save" application as the cloning data, it is determined in step S203 whether or not the unapproved flag is valid. When the unapproved flag is not valid, in step S207, the "simple box save" application is executed. In other words, in a state where the unapproved flag is not valid, that is, in a state where the unapproved flag is invalidated, the warning screen as illustrated in FIG. 8 which will be described later or the approval screen as illustrated in FIG. 9 is not displayed, and the "simple box save" application can be executed.

In step S203, when the unapproved flag is valid, it is determined in step S204 whether the user is the owner of the "simple box save" application or the administrator of the image forming apparatus.

Figure 8:
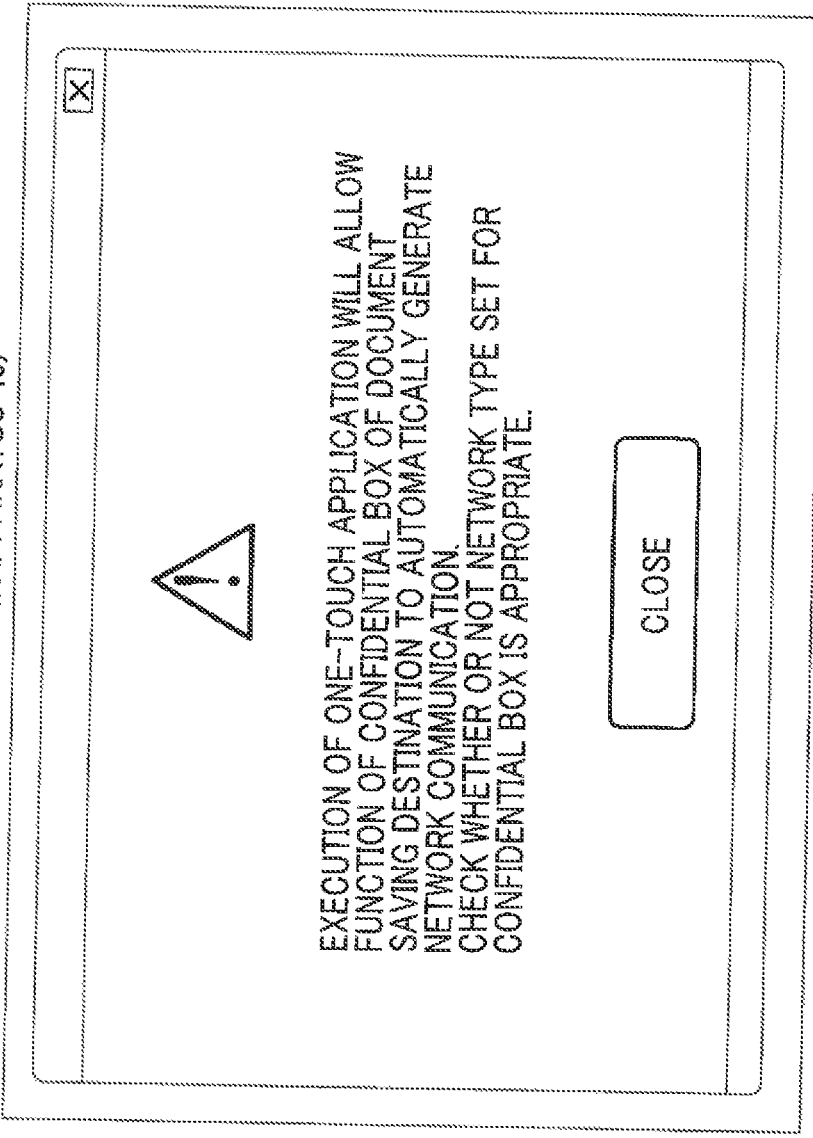
FIG. 8 is a view illustrating an example of the display screen displayed on the operation panel when the one-touch application is activated in the image forming apparatus 40 that is the cloning destination.

In addition, when the user is a person other than the owner of the "simple box save" application or the administrator of the image forming apparatus based on the identification information received by the reception unit 31, in step S208, for example, the display illustrated in FIG. 8 is performed on the operation panel of the image forming apparatus 40, the warning screen indicating that the execution of the "simple box save" application is to be restricted is displayed.

In the example of the display screen illustrated in FIG. 8, when the "simple box save" application is executed, network communication is automatically started by the function of the confidential box number 001 of the image forming apparatus 40, and thus, the warning screen for asking the user to check whether or not the network type set for the confidential box number 001 is correct is displayed. Furthermore, the warning screen is for notifying the user that the execution cannot be performed as it is. At this time, information on the target network set in the confidential box number 001 of the image forming apparatus 40 may be displayed. Specifically, when being stored in the confidential box number 001, the application is transferred to the network Y different from the network X that is the cloning source, and thus, the warning screen indicating that there is a possibility of transfer to an address different from the cloning source may be displayed.

Then, in step S209, the user who has checked the display screen illustrated in FIG. 8 stops and ends the execution of the "simple box save" application.

In addition, in step S204, when the user is the owner of the "simple box save" application or the administrator of the image forming apparatus based on the identification information received by the reception unit 31, in step S205, for example, the display illustrated in FIG. 9 on the operation panel of the image forming apparatus 40 is performed, and the approval screen for receiving the approval of the execution of the "simple box save" application is displayed.

In the example of the display screen illustrated in FIG. 9, when the "simple box save" application is executed, the network communication is automatically started by the function of the confidential box number 001 of the image forming apparatus 40, and thus, the approval screen for asking the user to approve permission of the execution of the one-touch application is displayed. At this time, information on the target network set in the confidential box number 001 of the image forming apparatus 40 may be displayed. Specifically, when being stored in the confidential box number 001, the application is transferred to the network Y different from the network X that is the cloning source, and thus, the approval screen for the user to check whether or not the execution of the application is approved may be displayed.

Then, the owner of the "simple box save" application or the administrator of the image forming apparatus who has checked the display screen illustrated in FIG. 9 selects and presses the "approve" button, and accordingly, in step S206, the unapproved flag is turned off and invalidated. In addition, in step S207, the job of the "simple box save" application is executed.

FIG. 10 is a view illustrating a modification example of the approval screen in step S205.

When the user is an administrator of the image forming apparatus based on the identification information received by the reception unit 31 in the above-described step S204, for example, the display as illustrated in FIG. 10 is performed on the operation panel in step S205. In other words, the plural one-touch applications are displayed as the data to be cloned, and the approval button for receiving the approval for permitting the execution is displayed for each one-touch application. Furthermore, the collective approval button for receiving the collective approval of the execution of the plural one-touch applications is displayed. In other words, after the plural one-touch applications are cloned to the image forming apparatus and before executing the one-touch application for the first time, the approval screen for approving the execution of plural one-touch applications for each one-touch application, or for collectively approving the execution of the plural one-touch applications, is displayed.

Then, when the administrator of the image forming apparatus who has checked the display screen illustrated in FIG. 10 selects the "approve" button for each one-touch application and presses the "OK" button, the unapproved flag for the approved one-touch application is invalidated, and the job of the approved one-touch application can be executed. In addition, when the administrator of the image forming apparatus who has checked the display screen illustrated in FIG. 10 presses the "collectively approve" button and collectively approves the execution of the plural one-touch applications, the unapproved flag of the collectively approved one-touch applications is invalidated, and the jobs of the collectively approved one-touch application can be executed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
a processor programmed to
receive first data for replication of a function of storing data in a preset storage area,
validate restriction information for controlling execution of the function if the received first data for replication includes information indicating that a plurality of networks are set in the storage area in which the data is to be stored by the function, and
restrict execution of the function if the execution of the function is instructed and the restriction information is validated.

2. The image forming apparatus according to claim 1, wherein
the processor generates second data for replication including information on whether or not the networks are set in the storage area in which the data is to be stored by the function, when the function of storing the data in the preset storage area is replicated to another apparatus, and
the processor outputs the generated second data for replication.

3. The image forming apparatus according to claim 1, wherein
the processor performs control to display a warning screen indicating that the execution of the function is to be restricted together with the information indicating the networks, when the execution of the function is to be restricted.

4. The image forming apparatus according to claim 3, wherein
the processor receives identification information identifying a user, and
the processor performs control to display a handler for receiving an approval of the execution of the function on the warning screen, when the received identification information belongs to an owner of the function or an administrator of the image forming apparatus.

5. The image forming apparatus according to claim 4, wherein
the processor invalidates the restriction information upon selection of the handler when the received identification information belongs to the owner of the function or the administrator of the image forming apparatus.

6. The image forming apparatus according to claim 4, wherein
the processor ends the execution of the function after the warning screen indicating that the execution of the function is to be restricted is displayed, when the received identification information belongs to any one other than the owner of the function or the administrator of the image forming apparatus.

7. The image forming apparatus according to claim 3, wherein
the processor receives identification information identifying a user, and
the processor performs control to display a collective approval screen for collectively approving the execution of a plurality of functions before the functions are executed by the image forming apparatus, when the received identification information belongs to an administrator of the image forming apparatus.

8. The image forming apparatus according to claim 7, wherein
the processor performs control to display the collective approval screen for collectively approving the execution of the plurality of functions after the plurality of functions are replicated to the image forming apparatus.

9. The image forming apparatus according to claim 7, wherein
the processor invalidates the restriction information on the collectively approved functions when the execution of the plurality of functions is collectively approved on the collective approval screen.

10. The image forming apparatus according to claim 1, wherein
the function is to execute specific processing based on contents set by a user.

11. A non-transitory computer readable medium storing a program causing a computer to enable an image forming apparatus to execute a process comprising:
    receiving first data for replication of a function of storing data in a preset storage area;
    validating restriction information for controlling execution of the function if the received first data for replication includes information indicating that a plurality of networks are set in the storage area in which the data is to be stored by the function; and
    restricting execution of the function if the execution of the function is instructed and the restriction information is validated.

\* \* \* \* \*